United States Patent
Wu et al.

(10) Patent No.: US 8,266,470 B2
(45) Date of Patent: Sep. 11, 2012

(54) CLOCK GENERATING DEVICE, METHOD THEREOF AND COMPUTER SYSTEM USING THE SAME

(75) Inventors: Ching-Yen Wu, Taipei (TW); Chi Chang, Taipei (TW)

(73) Assignee: ASMedia Technology Inc., New Taipei (TW)

( * ) Notice: Subject to any disclaimer, the term of this patent is extended or adjusted under 35 U.S.C. 154(b) by 431 days.

(21) Appl. No.: 12/564,907

(22) Filed: Sep. 22, 2009

(65) Prior Publication Data

US 2010/0077248 A1 Mar. 25, 2010

(30) Foreign Application Priority Data

Sep. 24, 2008 (TW) .............................. 97136718 A

(51) Int. Cl.
*G06F 1/04* (2006.01)
*G06F 1/00* (2006.01)

(52) U.S. Cl. .......................... 713/600; 713/322; 713/323

(58) Field of Classification Search .................. 713/500
See application file for complete search history.

(56) References Cited

U.S. PATENT DOCUMENTS

| 6,163,687 | A  | * | 12/2000 | Scott et al. | 455/316 |
| 6,754,837 | B1 | * | 6/2004 | Helms | 713/322 |
| 6,795,927 | B1 | * | 9/2004 | Altmejd et al. | 713/300 |
| 6,809,606 | B2 | * | 10/2004 | Wong et al. | 331/175 |
| 6,924,710 | B2 | * | 8/2005 | Wong et al. | 331/175 |
| 7,073,082 | B2 | * | 7/2006 | Hsu | 713/323 |

FOREIGN PATENT DOCUMENTS

| CN | 1532666 | 9/2004 |
| CN | 1874158 | 12/2006 |

* cited by examiner

*Primary Examiner* — Suresh Suryawanshi
(74) *Attorney, Agent, or Firm* — Jianq Chyun IP Office

(57) ABSTRACT

A clock generating device, method thereof and a computer system using the same are provided. The clock generating device includes a PLL module and a tuning module. The PLL module receives a reference clock signal, and generates an output clock signal as a basic clock of a computer system according to a phase difference between a reference clock signal and a feedback signal. The PLL module includes a frequency divider adjusting an intrinsic frequency dividing ratio according to a control signal and performs a frequency dividing processing on the output clock signal to generate a feedback signal. The tuning module coupled with the PLL module generates the control signal according to a VID of a CPU and one of the feedback signal and the reference clock. Therefore, the operation frequency of the components serving the output clock signal as the basic frequency in the computer system can be synchronously tuned.

11 Claims, 3 Drawing Sheets

CLOCK GENERATING DEVICE, METHOD THEREOF AND COMPUTER SYSTEM USING THE SAME

CROSS-REFERENCE TO RELATED APPLICATION

This application claims the priority benefit of Taiwan application serial No. 97136718, filed on Sep. 24, 2008. The entirety of the above-mentioned patent application is hereby incorporated by reference herein and made a part of this specification.

BACKGROUND OF THE INVENTION

1. Field of the Invention

The invention relates to a clock generating device, a method thereof, and a computer system using the same and, more particularly, to a device for tuning a frequency of an output clock signal according to a voltage identification definition (VID) of a central processing unit (CPU).

2. Description of the Related Art

Nowadays, to improve a performance and service time of products in an information technology (IT) industry, a demand for a power standard gradually become higher. All advance RISC machine (ARM) processors, Intel processors, and AMD processors are designed with a dynamic voltage frequency scaling (DVFS) function to dynamically reduce an operating frequency and an operating voltage of the computer system when the computer system is idle or does not need heavy computation.

FIG. 1 is a block diagram showing a conventional computer system. A CPU 120 and a chipset 130 receive a clock signal HCLK generated by a clock generator 110 to serve as a basic clock at which the CPU 120 and the chipset 130 operate. The frequency identification definition (FID) and a VID generated by the CPU 120 are changed along with an operating mode to dynamically adjust the operating frequency and the operating voltage to reduce power consumption. When a computer system 100 does not need to consume a great deal of power on heavy computation, a phase lock loop (PLL) in the CPU 120 internally adjusts the frequency of the received clock signal HCLK or an intrinsic frequency dividing ratio to reduce the operating frequency of the CPU 120. Furthermore, the CPU 120 also generates the VID to a voltage regulator module (VRM) 140 according to the operating mode to allow the VRM 140 to reduce an operating voltage Vcore of the CPU 120 according to the VID.

However, the above voltage and frequency dynamic adjusting mechanism is used for adjusting the operating frequency and the operating voltage of the CPU 120. Thus, operating frequencies of the chipset 130 and a dynamic random access memory (DRAM) 150 connected with the CPU 120 via a front side bus (FSB) keeps original. As a result, the computer system 100 still has unnecessary power consumption when it is idle or does not need heavy computations.

BRIEF SUMMARY OF THE INVENTION

The invention provides a clock generating device and a method thereof. The clock generating device and a method thereof can tune a frequency of an output clock signal generated by the CPU according to a VID of a CPU. As a result, the clock generating device and a method thereof can provide a proper output clock signal as a basic clock of a computer system according to an operating mode of the CPU to allow the computer system to operate more effectively and reduce power consumption.

The invention provides a computer system using the above clock generating device, and the computer system also has the above advantages.

The invention provides a clock generating device. The clock generating device includes a PLL and a tuning module. The PLL receives a reference clock signal and generates an output clock signal to a computer system to serve as a basic clock of the computer system. The PLL includes a frequency divider. The frequency divider tunes a frequency dividing ratio according to a control signal and performs a frequency dividing processing on the output clock signal to generate a feedback signal according to the frequency dividing ratio. The tuning module is coupled with the PLL. The tuning module generates the control signal according to a VID of the CPU and one of the feedback signal and the reference clock signal to tune a frequency of the output clock signal.

The invention provides a computer system. The computer system includes a CPU and a clock generating device. The CPU receives an output clock signal serving as the basic clock at which the CPU operates and generating a VID according to an operating mode. The clock generating device is coupled with the CPU. The clock generating device tunes a frequency of the output clock signal according to the VID and generates the output clock signal.

The invention provides a clock generating method to provide an output clock signal serving as a basic clock of a computer system. The clock generating method includes the following steps. First, a frequency dividing ratio is adjusted according to a VID of a CPU and one of a feedback signal and a reference clock signal. Second, a frequency dividing processing is performed on the output clock signal according to the frequency dividing ratio, and the feedback signal is generated. Afterwards, a phase difference between the reference clock signal and the feedback signal is detected, and the output clock signal is generated according to the phase difference.

The invention utilizes a VID of a CPU to tune a frequency of an output clock signal to allow a frequency of an output clock signal to be dynamically tuned according to an operating mode of the CPU. The operating frequency of components in the computer system can be synchronously tuned to improve a performance of the computer system, and the components utilize the output clock signal as a basic clock. Thus, the power consumption is reduced.

These and other features, aspects and advantages of the present invention will become better understood with regard to the following description, appended claims, and accompanying drawings.

DETAILED DESCRIPTION OF THE EMBODIMENTS

Figure 1:
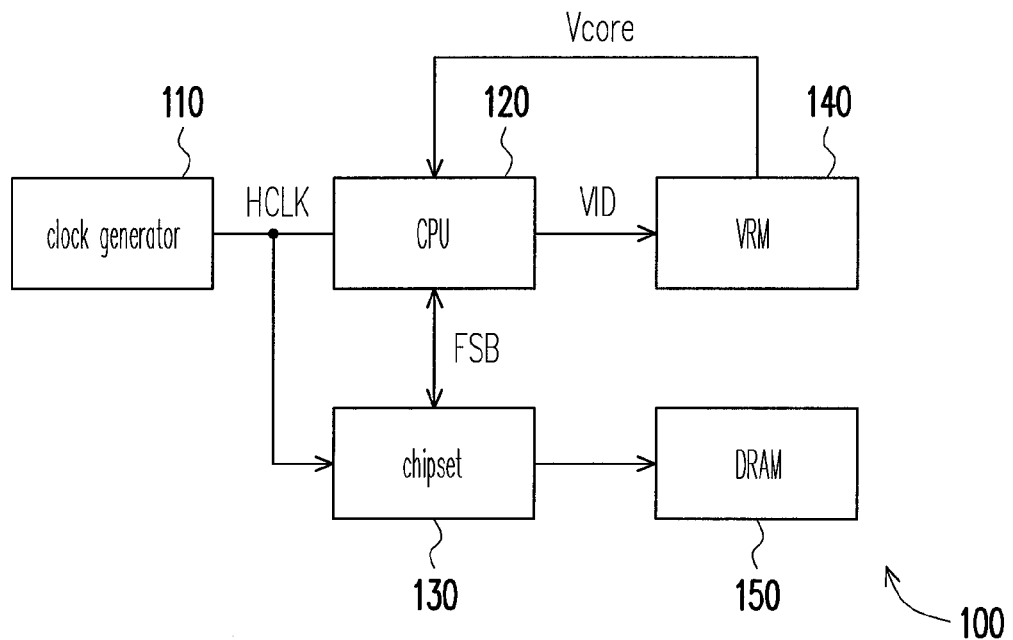
FIG. 1 is a block diagram showing a conventional computer system.
Figure 2A:
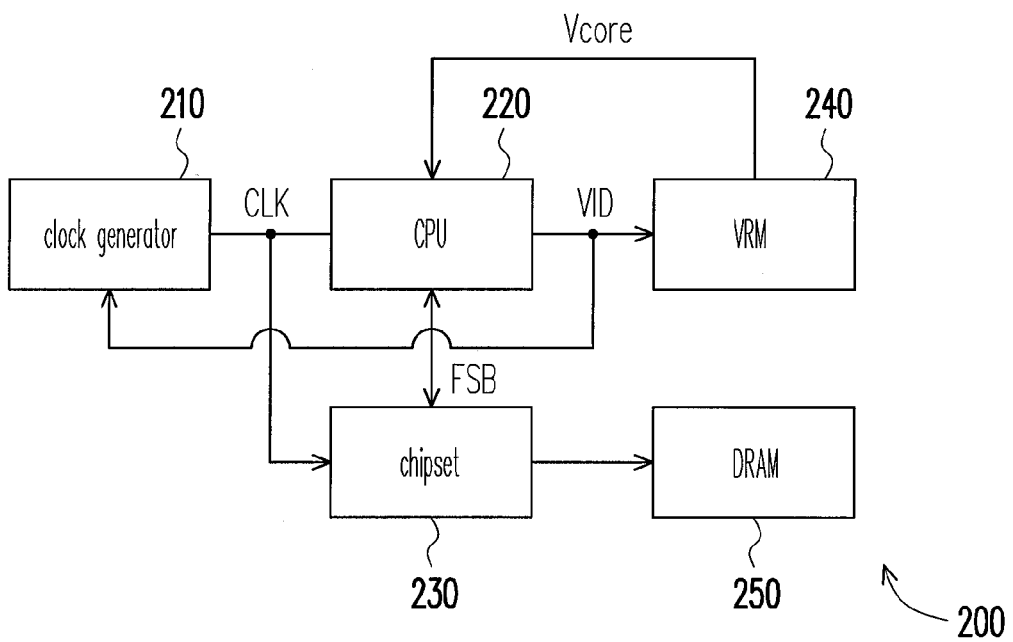
FIG. 2A is a block diagram showing a computer system according to an embodiment of the invention.

FIG. 2A is a block diagram showing a computer system according to an embodiment of the invention. A computer system 200 includes a clock generating device 210, a CPU 220, a chipset 230, a VRM 240, and a DRAM 250. The CPU 220 receives an output clock signal CLK generated by the clock generating device 210 to serve as the basic clock at which the CPU 220 operate, and it generates a VID to the VRM 240 according to its operating mode. Thus, the VRM 240 generates the operating voltage Vcore to the CPU 220 according to the VID to supply power to the CPU 220. For example, when the computer system 200 is idle, since the computation quantity of the CPU 220 is reduced, the CPU 220 generates the VID corresponding to the present operating mode to the VRM 240 to allow the VRM to provide the lower operating voltage Vcore to the CPU 220 to reduce the power consumption of the computer system 200.

The clock generating device 210 is coupled with the CPU 220 and the chipset 230. The clock generating device 210 tunes a frequency of the output clock signal CLK and generates the output clock signal CLK according to the VID generated by the CPU 220. In this embodiment, the CPU 220 and the chipset 230 in the computer system 200 utilizes the output clock signal CLK as the basic clock at which the CPU 120 and the chipset 130 operate. Therefore, when the frequency of the output clock signal CLK is changed along with the operating mode of the CPU 220, the operating frequencies of the CPU 220 and the chipset 230 are tuned synchronously to reduce the power consumption of the computer system 200. The chipset 230 transfers data to the CPU 220 and controls the DRAM 250 via the FSB.

Figure 2B:
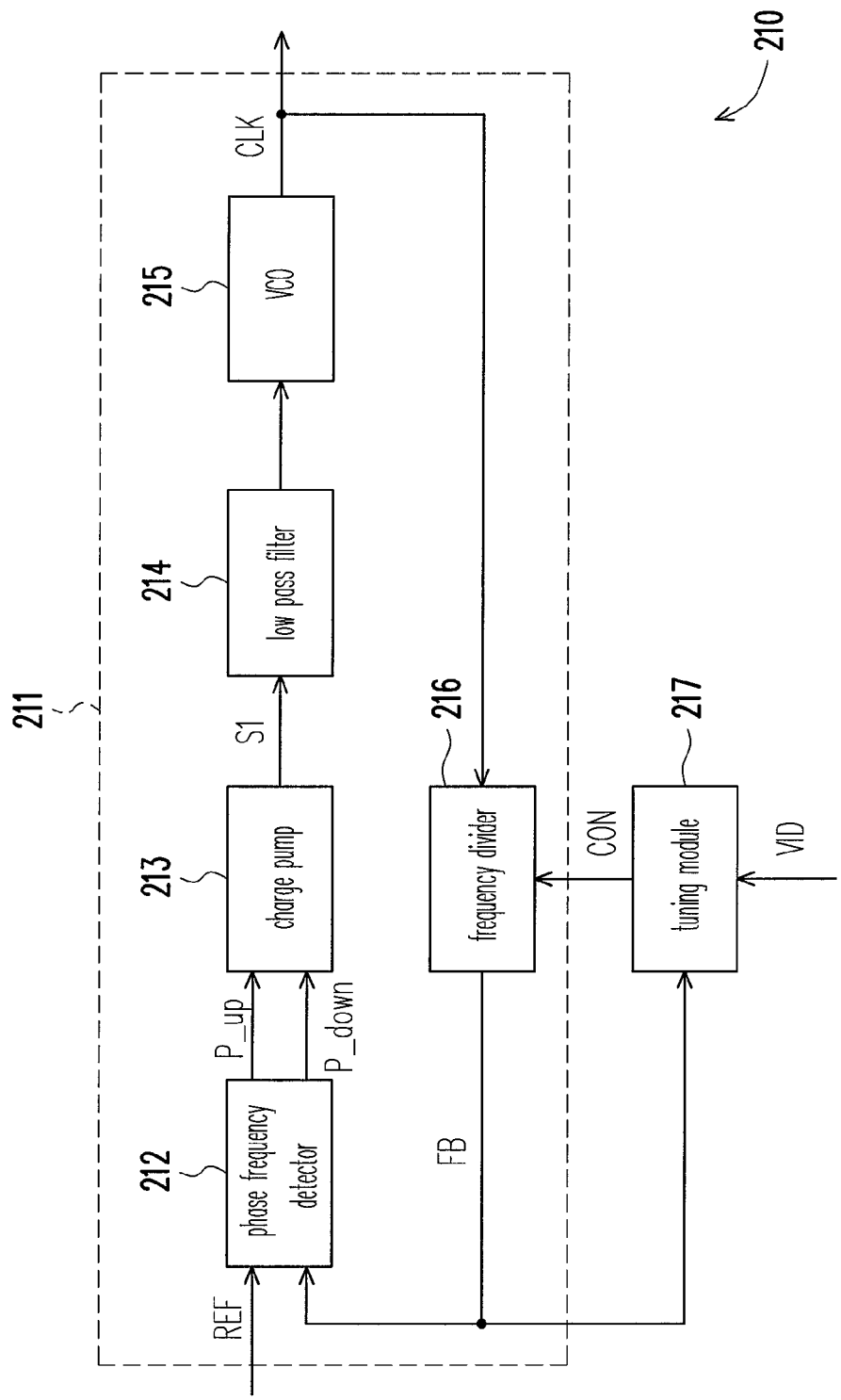
FIG. 2B is a block diagram showing a clock generating device in FIG. 2A according to an embodiment of the invention.

FIG. 2B is a block diagram showing a clock generating device 210 in FIG. 2A according to an embodiment of the invention. In FIG. 2A and FIG. 2B, the clock generating device 210 includes a PLL module 211 and a tuning module 217. The PLL module 211 generates the output clock signal CLK according to a phase difference between a reference clock signal REF and a feedback signal FB. The PLL module 211 includes a phase frequency detector 212, a charge pump 213, a low pass filter 214, a voltage controlled oscillator (VCO) 215, and a frequency divider 216. The phase frequency detector 212 detects the phase difference between the reference clock signal REF and the feedback signal FB and generates a pull-up signal P_up and a pull-down signal P_down according to the phase difference to control the charge pump 213 to charge or discharge. Since changes of the phase difference signals are very small, the phase difference signals are amplified via the charge and the discharge of the charge pump 213 to generate a first signal S1. The low pass filter 214 receives the first signal S1 and performs a low-pass filtering processing on the first signal S1 to generate a direct current (DC) control voltage in direct proportion to the phase difference, and it transmits the DC control voltage to the VCO 215 to control the operation of the VCO 215. Therefore, the VCO 215 can tune the frequency of the output clock signal CLK according to the first signal S1. The frequency divider 216 in the PLL module 211 adjusts the intrinsic frequency dividing ratio according to a control signal CON generated by the tuning module 217 and performs the frequency dividing processing on the output clock signal CLK to generate a feedback signal.

The tuning module 217 is coupled with the PLL module 211. The tuning module 217 generates the control signal CON according to the VID generated by the CPU 220 and the feedback signal FB to tune the frequency dividing ratio of the frequency divider 216. In this embodiment, the tuning module 217 receives the VID in a digital data form and maps the VID to a corresponding predetermined frequency dividing ratio via a simple logical circuit. At the time, the tuning module 217 and the frequency divider 216 forms a feedback circuit. The tuning module 217 gradually adjusts the frequency dividing ratio of the frequency divider 216 to be the above predetermined frequency dividing ratio via a small variation, and it utilizes the feedback signal FB obtained by performing the frequency dividing processing as a reference frequency at which the tuning module 217 operate. In other words, the tuning module 217 refers to the VID information and slowly adjusts the frequency dividing ratio of the frequency divider 216 in the PLL module 211 to avoid that the frequency of the output clock signal CLK changes quickly. When the output clock signal CLK changes slowly, PLLs (not shown in FIG. 2A) in components (such as the CPU 220 and the chipset 230) in the computer system 200 can fully track the change of the frequency of the output clock signal CLK to allow the PLLs to remain in the synchronous state, and the components utilize the output clock signal CLK as the basic clock. The output clock signal CLK is supposed to be in accord with an input frequency width range of the PLLs in the components.

Figure 2C:
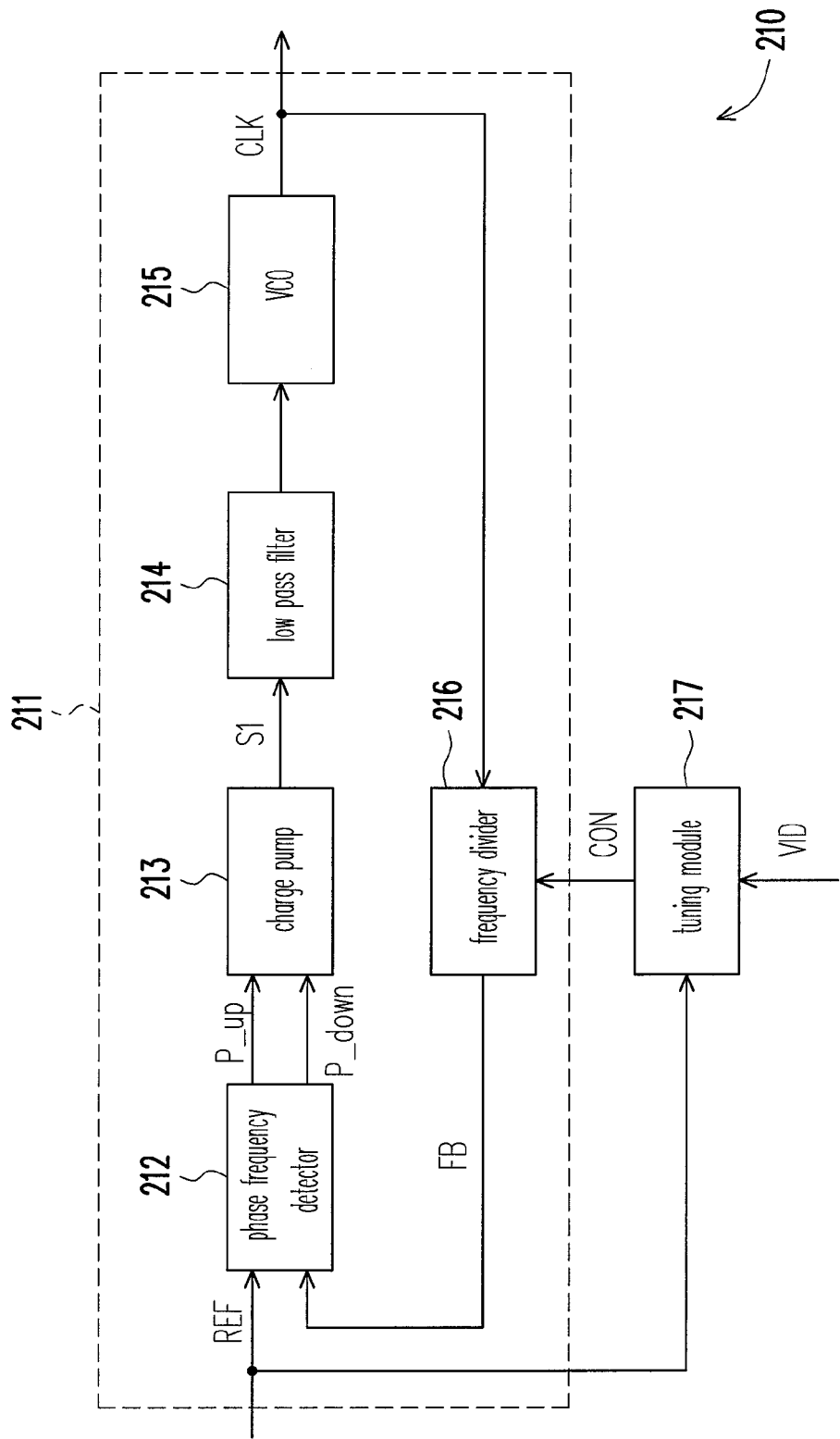
FIG. 2C is a block diagram showing a clock generating device in FIG. 2A according to another embodiment of the invention.

FIG. 2C is a block diagram showing a clock generating device 210 in FIG. 2A according to another embodiment of the invention. The tuning module 217 may generate the control signal CON to adjust the frequency dividing ratio of the frequency divider 216 according to the VID generated by the CPU 220 and the reference clock signal REF. In this embodiment, the tuning module 217 utilizes the reference clock signal REF as the reference frequency and refers to the VID information to slowly adjust the frequency dividing ratio of the frequency divider 216 in the PLL module 211 to avoid that the frequency of the output clock signal CLK changes too quickly. The operation in the embodiment as shown in FIG. 2C is the same as that in the embodiment as shown in FIG. 2C, the operating thereof are not described for a concise purpose.

As stated above, the clock generating device 210 in the above embodiments refers to the VID information of the CPU 220 to change the frequency of the output clock signal CLK. As a result, when the computer system 200 is idle or does not need heavy computations, it can gradually reduce the frequency of the output clock signal CLK via the tuning module 217 in the clock generating device 210 to reduce the power consumption of the computer system 200. Furthermore, the operating frequencies of the components in the computer system 200 can also be synchronously tuned, and the components utilize the output clock signal CLK as the basic clock. Thus, the power consumption of the computer system 200 can be reduced greatly. The tuning module 217 in the embodiments can automatically and dynamically tune the frequency of the output clock signal CLK. Thus, a user does not need to set or reset the computer system 200 via a basic input/output system (BIOS).

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A clock generating device, adapted for a computer system, the clock generating device comprising:
   a phase lock loop (PLL) module receiving a reference clock signal and generating an output clock signal serving as a basic clock of the computer system, wherein the PLL module comprises a frequency divider, and the frequency divider adjusts a frequency dividing ratio according to a control signal and performs a frequency dividing processing on the output clock signal to generate a feedback signal; and a tuning module coupled with the PLL module, wherein the tuning module adjusts a frequency of the output clock signal by the control signal and generates the control signal according to a voltage identification definition (VID) of a central processing unit (CPU) and one of the feedback signal and a reference clock signal, and the adjusted frequency serves as the basic clock of the computer system.

2. The clock generating device according to claim 1, wherein the PLL module further comprises:

a phase frequency detector detecting a phase difference between the reference clock signal and the feedback signal and generating a pull-up signal and a pull-down signal according to the phase difference;

a charge pump coupled with the phase frequency detector, wherein the charge pump performs charge and discharge according to the pull-up signal and the pull-down signal and generates a first signal; and a voltage controlled oscillator (VCO) coupled with the charge pump, wherein the VCO receives the first signal and generates the output clock signal according to the first signal.

3. The clock generating device according to claim 2, wherein the PLL module further comprises:

a low pass filter coupled between the charge pump and the VCO and used for performing a low-pass filtering processing on the first signal and transmitting the first signal to the VCO.

4. A computer system, comprising:

a CPU (central processing unit) receiving an output clock signal serving as a basic clock at which the CPU operate and generating a VID (voltage identification definition) according to an operating mode; and a clock generating device coupled with the CPU, wherein the clock generating device tunes a frequency of the output clock signal according to the VID and generates the output clock signal, wherein the clock generating device comprises a tuning module, the tuning module adjusts the frequency of the output clock signal by a control signal and generates the control signal according to the VID of the CPU and one of the feedback signal and a reference clock signal, and the adjusted frequency serves as the basic clock of the computer system.

5. The computer system according to claim 4, wherein the clock generating device comprises:

a PLL module coupled with the tuning module, receiving the reference clock signal and generating the output clock signal, wherein the PLL module comprises a frequency divider, and the frequency divider adjusts a frequency dividing ratio according to the control signal and performs a frequency dividing processing on the output clock signal to generate the feedback signal.

6. The computer system according to claim 5, wherein the PLL module further comprises:

a phase frequency detector detecting a phase difference between the reference clock signal and the feedback signal and generating a pull-up signal and a pull-down signal according to the phase difference;

a charge pump coupled with the phase frequency detector, wherein the charge pump performs charge and discharge according to the pull-up signal and the pull-down signal and generates a first signal; and a VCO coupled with the charge pump, wherein the VCO receives the first signal and generates the output clock signal according to the first signal.

7. The computer system according to claim 6, wherein the PLL module further comprises:

a low pass filter coupled between the charge pump and the VCO and used for performing a low-pass filtering processing on the first signal and transmitting the first signal to the VCO.

8. The computer system according to claim 4, further comprising:

a VRM coupled with the CPU, wherein the VRM generates an operating voltage to supply power to the CPU according to the VID.

9. The computer system according to claim 4, further comprising:

a chipset coupled with the clock generating device, wherein the chipset receives the adjusted output clock signal serving as the basic clock at which the chipset operates.

10. A clock generating method, adapted for providing an output clock signal serving as a basic clock of a computer system, comprising:

generates a control signal according to a VID (voltage identification definition) of a CPU (central processing unit) and one of a feedback signal and a reference clock signal to adjust a frequency of the output clock signal, wherein the adjusted frequency serves as the basic clock of the computer system;

adjusting a frequency dividing ratio according to the control signal;

performing a frequency dividing processing on the output clock signal according to the frequency dividing ratio and generating the feedback signal; and detecting a phase difference between the reference clock signal and the feedback signal and generating the adjusted output clock signal according to the phase difference.

11. The clock generating method according to claim 10, wherein the step of detecting the phase difference between the reference clock signal and the feedback signal and generating the output clock signal according to the phase difference comprises:

generating a pull-up signal and a pull-down signal according to the phase difference;

controlling a charge pump to perform charge or discharge and generating a first signal according to the pull-up signal and the pull-down signal; and tuning a frequency of the output clock signal and generating the output clock signal according to the first signal.

* * * * *